Patented Aug. 20, 1940

2,212,149

UNITED STATES PATENT OFFICE 2,212,149

PROCESS OF PREPARING BETA-ETHYL-AMINOETHANOLS

Merlin Martin Brubaker and Robert William Maxwell, Wilmington, Del., assignors to E. I. du Pont de Nemours & Company, Wilmington, Del., a corporation of Delaware No Drawing. Application April 8, 1938. Serial No. 201,009

11 Claims. (Cl. 260—584)

This invention relates to the preparation of amines, more particularly to the preparation of amines having ethyl and hydroxyalkyl groups attached to the amino nitrogen, and still more particularly to replacement of the aminohydrogen of certain hydroxyalkylamines by ethyl groups.

In the alkylation of primary and secondary amines, various alkylating agents have been used with success. However, in the alkylation of amines wherein the organic residue present on the amino nitrogen contains the hydroxyl group, which is itself reactive towards alkylating agents, there is always the possibility that the hydroxyl hydrogen will react rather than the amino hydrogen. In addition, the alkylation of primary and secondary amines with alkyl halides leads generally to mixtures of products containing quaternary ammonium salts (Richter—Organic Chemistry (1913) vol. 1, page 161), and in Schlenk and Bergmann's Organische Chemie (Deuticke Leipzig, 1932, p. 201), it is even stated that a mixture "always results" and that therefore the alkylation with alkyl halides "is of slight importance." As a matter of fact, the methylation with methyl halides of amino nitrogen containing $\beta$-hydroxyethylamines leads to the formation of quaternary ammonium salts in such large proportions as to make such method of methylation uneconomic.

Heretofore in the manufacture of N-ethyl-N-($\beta$-hydroxyethyl)amines, it has been necessary to use procedures which are uneconomic because of the low yield of product or the high cost of the reagents involved. Thus, good yields may be obtained by condensing ethylene oxide or ethylene chlorohydrin with diethylamine, but these reagents, particularly the diethylamine, are so expensive that the product can be used only for purposes where cost is not an important item, e. g. in the manufacture of pharmaceuticals. $\beta$-diethylaminoethanol has also been made by the reduction of diethylaminoacetic acid esters, but this method is only of laboratory interest. It has also been proposed to ethylate $\beta$-hydroxyethylamine with diethylsulfate, but this again is not a cheap reagent. Furthermore, the proportion by weight of diethylsulfate which actually takes part in ethylation reactions is quite low (18.8%), which increases still more the cost of the preparation.

This invention has as an object the provision of a process whereby N-ethyl-N-($\beta$-hydroxyethyl) amines are prepared substantially unadmixed with quaternary ammonium compounds. A further object is the preparation of N-ethyl-N-($\beta$-hydroxyalkyl) amines substantially free from quaternary ammonium salts. A further object is an economic process for the preparation of N-ethyl-N-hydroxyalkylamines, and particularly $\beta$-diethylaminoethanol, from cheap and readily available raw materials. A further object is the development of such a process resulting in good yields. Other objects will appear hereinafter.

These objects are accomplished by the following invention wherein a $\beta$-hydroxyalkylamine having at least one amino hydrogen atom and particularly $\beta$-hydroxyethylamine, is reacted with ethyl chloride at a temperature below about 95° C., the resulting hydrohalide decomposed with alkali, and the desired amine isolated. In the preferred practice of the invention, the reaction is conducted under pressure, and, particularly where two ethyl groups are to be introduced, it is carried out in two or more stages, a portion of the ethyl chloride being added and the resulting hydrohalide decomposed, another portion of ethyl chloride added and the hydrohalide decomposed, and so on. This manner of operation minimizes quaternary salt formation, the tendency toward which is especially pronounced with hydroxy primary amines.

The more detailed practice of the invention is illustrated by the following examples, wherein parts given are by weight. There are of course many forms of the invention other than these specific embodiments.

Example I

Six hundred fifty (650) parts of $\beta$-hydroxyethylamine was placed in a nickel lined autoclave with 725 parts of ethyl chloride. The mixture was heated to 61° C. over a period of 35 minutes, after which the temperature was brought slowly to 81° C. over a 4 hour period. After heating for a further three hours at the latter temperature, the pressure in the autoclave had dropped to the starting pressure. A solution of 440 parts of sodium hydroxide in 800 parts of water was then added and the mixture stirred for one hour. One hundred twenty (120) parts of solid sodium hydroxide and 780 parts of ethyl chloride were next introduced and the mixture again heated at about 70° C. for five hours. At the end of this time, the pressure had again fallen to the starting pressure, whereupon the autoclave was cooled and opened. The product consisted of two layers, the top one principally $\beta$-diethylaminoethanol, the lower a saturated aqueous sodium chloride solution. The top layer was drawn off, and the residue diluted with 1500 parts of water and steam distilled until salt commenced to separate in the distillation flask. The distillate was combined with the liquor separated first from the reaction mixture, toluene added, the water removed by distilling off water and toluene, separating the toluene and water, and returning the toluene to the reaction vessel. When all the water had been removed, as shown by a clear distillate, the residue was fractionated, the toluene passing over first and being followed by the desired product, β-diethylaminoethanol, a water white liquid boiling at 158° to 160° C. A yield of 930 parts, or 74% of the theoretical, was obtained.

*Example II*

An autoclave was charged with 610 parts of β-hydroxyethylamine, and 675 parts of ethyl chloride was then introduced under pressure. The mixture was heated at 65° C. for about 8 hours at the end of which time the pressure had dropped to the initial value. There was then introduced, under pressure, 480 parts of sodium hydroxide in 480 parts of water. This was followed by 675 parts of ethyl chloride. This mixture was heated another 8 hours at 65° C. by which time the pressure had again dropped substantially. The autoclave was cooled and discharged. The crude reaction product consisted of solid salt, an aqueous layer and about 100 parts of an insoluble liquid which appeared to be mostly diethyl ether. One thousand one hundred twenty (1120) parts of 50% aqueous sodium hydroxide solution was added, whereupon the reaction mixture became warm and the ether vaporized. An oily layer then separated. The oil was decanted off, and the residue dissolved in water and steam distilled until substantially no amine was present in the distillate as indicated by titration of a small volume with 0.1 N sulfuric acid using phenolphthalein as an indicator. The total volume of distillate obtained was about 600 parts. This was combined with the oily layer, 500 parts of toluene added, and the water and toluene distilled off at atmospheric pressure. The residue was then subjected to fractional distillation. After the toluene had been removed, the desired product, β-diethylaminoethanol passed over at 159° to 160° C., 820 parts or a yield of 70% based on the β-hydroxyethylamine, being obtained.

*Example III*

A mixture of 732 parts of β-hydroxyethylamine and 780 parts of ethyl chloride was heated at 65° C. in an autoclave for nine hours. Five hundred twenty (520) parts of sodium hydroxide and 520 parts of water were then introduced to decompose the hydrohalide. An additional 780 parts of ethyl chloride was added, and the mixture was again heated at 65° C. for 12 hours. At the end of this time, a solution of 160 parts of sodium hydroxide in 160 parts of water was introduced, followed by 260 parts of ethyl chloride, and the mixture heated at 65° C. for 8 hours. The autoclave was then cooled and opened. The contents consisted of sodium chloride crystals, an aqueous layer, and a supernatant layer of about 700 parts, which appeared to be mostly diethyl ether. Five hundred twenty (520) parts of sodium hydroxide dissolved in 520 parts of water was added, whereupon the ether was vaporized due to the heat developed, two layers being formed in the residual liquid. The upper layer was decanted off, and the residue steam distilled until approximately 1000 parts of distillate was obtained. The distillate was combined with the previously decanted layer, toluene added, and the water and toluene distilled off. The residue was then fractionated, 1150 parts or an 83% yield of the desired β-diethylaminoethanol being obtained.

The present process may also be used to replace a single amino hydrogen of a β-hydroxy primary alkyl amine by an ethyl group. This is illustrated in the following example:

*Example IV*

Eighty-nine (89) parts of β-hydroxyethylamine was placed in an autoclave with 65 parts of ethyl chloride and the mixture heated slowly to 65° C. This temperature was maintained until the pressure showed a substantial drop, or for about 9 hours. Heating was then discontinued, the autoclave cooled and opened, and the contents mixed with 100 parts of 50% aqueous sodium hydroxide solution. The N-ethyl-N-(β-hydroxyethyl)amine thus formed was isolated and purified by steam distillation, dehydration by distilling with toluene, and fractionation of the toluene solution. The yield was generally 80% or better.

The reaction product mixture usually consists principally of the N-(mono- or diethyl)-N-(β-hydroxyalkyl) amine, sodium chloride, and lesser and varying quantities of quaternary salts and diethyl ether. Where the desired amine is low boiling or volatile with steam, as is β-diethylaminoethanol, it can be removed from the salts in the reaction mixture by ordinary or steam distillation at atmospheric pressure. If too much salt separates out, more water can be added and the distillation repeated. The amine is easily separated from the water in the distillate by extraction with ether, or by adding a water-immiscible inert liquid such as toluene and distilling off water and toluene. In instances where the amino alcohol is difficultly volatile, it may be isolated by extracting the crude reaction product with ether, drying the ether solution, and distilling off the ether.

In carrying out the reaction, the essential condition is that the temperature be maintained below about 95° C. and preferably below about 80° C. Ethylation of the hydroxyalkylamine at the nitrogen occurs virtually to the exclusion of quaternary ammonium compound formation at temperatures below about 80° C. The amount of quaternary ammonium compound formed is greater at reaction temperatures between 80° C. and 95° C., but the amount is still not too objectionable. Above 100° C., quaternary ammonium compound formation predominates. Thus, it was found that, by heating a mixture of 2 mols of β-diethylaminoethanol, 2 mols of ethyl chloride and 1 mol of β-hydroxyethylamine for about three hours at 120° C., practically all of the β-diethylaminoethanol was converted to β-hydroxyethyltriethylammonium chloride, with practically no formation of β-diethylaminoethanol. At 65° C. a mixture of ethyl chloride and β-diethylaminoethanol can be heated for 30 hours with only slight formation of quaternary salt. Under these conditions, substantially no etherification of the hydroxyl groups of either the original or final hydroxyamine appears to occur, although appreciable quantities of diethyl ether are always found.

The reaction proceeds, although more slowly, at lower temperature, even as low as the lowest temperature at which the reaction mixture can be maintained in a liquid or fluid condition. The reaction thus proceeds slowly at 20° C. although the time required for complete reaction is excessive. Even at 20° C. there is no noticeable alkylation of the hydroxyl group of the β-hydroxyalkylamine although appreciable quantities of ethyl ether, presumably from the alkylation of ethanol formed from the ethyl chloride, are obtained.

The use of diluents in the reaction mixture is permissible. Ethanol, benzene and water have all been found satisfactory. However, when a diluent capable of reacting with ethyl chloride is present, the quantity of ethyl chloride must be increased. Thus, for example, when water is present, ethyl chloride is consumed in appreciable quantity by the formation of diethyl ether.

The reaction may be carried out at normal or reduced or increased pressure. Increased pressure facilitates reaction and is therefore a preferred operating condition.

The reaction is of generic applicability to β-hydroxyalkylamines having at least one amino hydrogen atom. That is, the amino nitrogen must be primary or secondary and the hydroxyl oxygen must be separated from the amino nitrogen by a chain of two carbons, thus

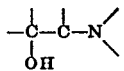

The alcohol group may be primary, secondary, or tertiary though the preference is in the order named. The hydroxyamine used may be a mono- or di-(β-hydroxyalkyl)amine; if the former and if the amine is secondary, the remainder of the molecule, so far as is known, is immaterial. The radical satisfying the third nitrogen valence, for instance, may be an alkyl, aryl (mono- or polynuclear), aralkyl, cycloalkyl, or heterocyclic group, and it may be saturated or unsaturated. The present process is particularly applicable to and preferred in connection with β-hydroxyethylamines. It is not concerned with nor applicable to α-hydroxyalkylamines, such as aldehyde ammonias, since these form an entirely different group of compounds. It is possible that hydroxyalkylamines in which the amine and hydroxyl groups are separated by more than two carbons could be used but little is definitely known of their behavior.

Specific β-hydroxyalkylamines suitable for use in the present process include β-hydroxyethylamine, bis-(β-hydroxyethyl)amine, N-ethyl-N-(β-hydroxyethyl)amine, N-methyl-N-(β-hydroxyethyl)amine, N-n-butyl-N-(β-hydroxyethyl)amine, β-hydroxypropylamine, β-hydroxy-β-methylpropylamine, β,γ-dihydroxypropylamine, 1-hydroxy-3-aminocylclohexane, N-cyclohexyl-N-(β-hydroxyethyl)amine, N-phenyl-N-(β-hydroxyethyl)amine, N-decyl-(β-hydroxyethyl)amine, N-decyl-(N-β-hydroxypropyl)amine, and N-octadecyl-N-(β-hydroxyethyl)amine.

The present process is especially suitable for the preparation of β-diethylaminoethanol because this material under ordinary reaction conditions tends to give quaternary salt especially badly. In general it has been found convenient to use ethyl chloride in quantity equivalent to the number of ethyl groups which it is desired to introduce. As already explained, it is advantageous to introduce only one ethyl group at a time, the reaction being conducted in stages, a deficiency of ethyl chloride being used initially and, when it is consumed, alkali being added before introduction of further quantities of ethyl chloride. If desired, alkali may be added continuously throughout the reaction. This favors a rapid reaction because the formation of amine hydrochloride tends to reduce the quantity of amine available for the reaction, thus slowing the ethylation.

Although a step-wise reaction is preferred with intermittent introduction of alkali to liberate the amine from the amine hydrochloride, the reaction can also be effected in one stage by incorporation of an alkali to take up hydrochloric acid as formed. In such cases, considerable hydrolysis of ethyl chloride and formation of ethyl ether takes place so that an unusually large proportion of ethyl chloride must be used.

In general, any inorganic, non-volatile, alkali may be used for setting the amine free from its salts. Suitable alkalis include sodium and potassium hydroxides, other caustic alkalis, the alkaline earth hydroxides, and the alkali metal carbonates. In the case of the carbonates, it is sometimes of interest to introduce them directly into the autoclave during reaction since, due to their slight alkalinity, the by-product, ethyl ether, is formed to only a very slight extent. However, at least one molecule of carbonate must be added for each molecule of hydrochloric acid to be neutralized or else carbon dioxide will be liberated and undesirably high pressures will be developed.

This invention is of use in the preparation of any N-ethyl-N-(β-hydroxyalkyl)amine. It is particularly suitable for the preparation of β-diethylaminoethanol, which is an important intermediate for pharmaceuticals and amine resins, e. g. the polymeric diethylaminoethyl methacrylates of Graves, Serial No. 21,807 and Harmon, Serial No. 21,810.

The process of the present invention is outstanding in that the N-ethyl-N-(β-hydroxyalkyl) amines may be prepared simply and in excellent yield from low cost, commercially available materials. The practical suppression of quaternary ammonium compound formation is not only of importance from the standpoint of freedom from admixture and attendant greater ease of purification, but also results in higher yields.

The above description and examples are intended to be illustrative only. Any modification of or variation therefrom which conforms to the spirit of the invention is intended to be included within the scope of the claims.

We claim:

1. Process of preparing β-diethylaminoethanol which comprises reacting ethyl chloride with β-hydroxyethylamine in a closed system at a temperature of from 20° to 80° C., adding caustic alkali and further ethyl chloride after reaction has taken place but before the reaction is completed, and isolating the β-diethylaminoethanol from the reaction mixture.

2. Process of preparing β-diethylaminoethanol which comprises reacting ethyl chloride with β-hydroxyethylamine in a closed system in the liquid phase at a temperature below 95° C. and adding caustic alkali and further ethyl chloride after the initial reaction has abated, to complete the reaction.

3. Process of preparing β-diethylaminoethanol which comprises reacting a chemical excess of ethyl chloride with β-hydroxyethylamine in a closed system in the liquid phase at a temperature below 95° C.

4. Process of preparing β-ethylaminoethanols which comprises reacting ethyl chloride with β-hydroxyethylamine in the liquid phase at a temperature below 95° C.

5. Process of preparing N-ethyl-N-(β-hydroxy alkyl) amines which comprises reacting ethyl chloride in the liquid phase at a temperature below 95° C. with a β-hydroxyalkylamine having two amino hydrogen atoms.

6. Process of preparing N-ethyl-N-(β-hydroxyalkyl) amines which comprises reacting, in the liquid phase at a temperature not over 100° C., ethyl chloride with a β-hydroxyalkylamine having two amino hydrogen atoms.

7. Process of preparing N-ethyl-N-β-hydroxy lower alkylamines which comprises reacting ethyl chloride in the liquid phase at a temperature below 95° C. with a β-hydroxy lower alkylamine having two amino hydrogen atoms.

8. Process of preparing N-ethyl-N-(β-hydroxyethyl) amines which comprises reacting ethyl chloride in the liquid phase at a temperature below 95° C., with a β-hydroxyethylamine having at least one hydrogen atom on the amino nitrogen atom, any remaining valence of the nitrogen being satisfied by a radical of the class consisting of alkyl, aryl and cycloalkyl radicals.

9. Process of preparing N-ethyl-N-(β-hydroxyalkyl) amines which comprises reacting ethyl chloride in the liquid phase at a temperature below 95° C. with a β-hydroxyalkylamine having at least one amino hydrogen atom, any remaining valence of the nitrogen being satisfied by a radical of the class consisting of alkyl, aryl and cycloalkyl radicals.

10. Process of preparing N-ethyl-N-(β-hydroxyalkyl) amines which comprises reacting, in the liquid phase at a temperature not over 100° C., ethyl chloride with a β-hydroxyalkylamine having at least one amino hydrogen atom, any remaining valence of the nitrogen being satisged by a radical of the class consisting of alkyl, aryl and cycloalkyl radicals.

11. Process of preparing N-ethyl-N-β-hydroxy lower alkylamines which comprises reacting ethyl chloride in the liquid phase at a temperature below 95° C. with a β-hydroxy lower alkylamine having at least one amino hydrogen atom, any remaining valence of the nitrogen being satisfied by a radical of the class consisting of alkyl, aryl and cycloalkyl radicals.

MERLIN MARTIN BRUBAKER.
ROBERT WILLIAM MAXWELL.

CERTIFICATE OF CORRECTION.

Patent No. 2,212,149. August 20, 1940.

MERLIN MARTIN BRUBAKER, ET AL.

It is hereby certified that error appears in the printed specification of the above numbered patent requiring correction as follows: Page 4, second column, line 13-14, for "satisged" read --satisfied--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.